(No Model.)
E. GILYARD & C. WARD.
COP AND TUBE SPINNING MACHINERY.
No. 555,504.  Patented Mar. 3, 1896.
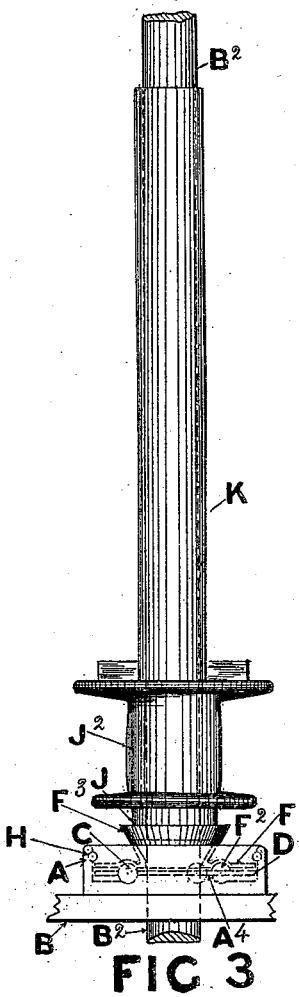
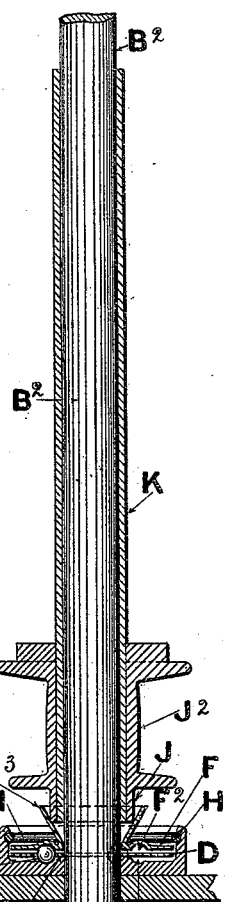
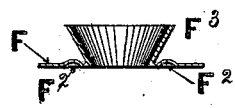
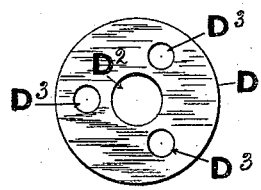
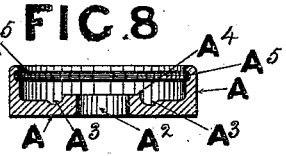
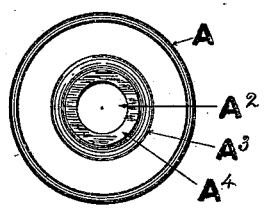
Witnesses:-
H. K. Boulter
C. Northup
Inventors:-
Edmund Gilyard,
Charles Ward.
By Wm C. Boulter
Attorney

UNITED STATES PATENT OFFICE.

EDMUND GILYARD AND CHARLES WARD, OF BRADFORD, ENGLAND.

COP AND TUBE SPINNING MACHINERY.

SPECIFICATION forming part of Letters Patent No. 555,504, dated March 3, 1896.

Application filed June 1, 1895. Serial No. 551,377. (No model.)

*To all whom it may concern:*

Be it known that we, EDMUND GILYARD and CHARLES WARD, subjects of the Queen of England, residing at Bradford, England, have invented certain Improvements in Cop and Tube Spinning Machinery, of which the following is a specification.

This invention relates to improvements in ball-bearings for supporting the tubes of cop and similar spinning machinery, and its object is to enable fewer balls to be used in this class of bearings, and also enable them to be more readily cleaned. For this purpose we employ several (preferably three, as shown) balls placed in an annular groove, preferably formed in the top face of a "washer" surrounding the spindle. The balls are separated by a perforated disk having a perforation for each ball an equal distance apart, and also a central perforation for the spindle. This disk may rest on a raised lip on the washer formed around the hole for the spindle. This revolving cap supporting the whirl and tube has preferably an annular groove formed in its upper side to rest upon said balls, and it may have a conical seat at the top to receive the usual projection on the bottom of the whirl. A flange may be formed around the washer outside, projecting above the cap so as to prevent the lubricant being thrown off by centrifugal force.

In the accompanying sheet of drawings, Figure 1 represents an elevation of a portion of a spindle with a tube thereon and our improved bearing applied thereto. Fig. 2 represents a similar view with the tube and bearing-case in section. Fig. 3 represents a plan view of Fig. 1 without the tube and whirl. Fig. 4 represents a similar view without the said revolving cap. Fig. 5 represents a diametrical section of the said cap. Fig. 6 represents a diametrical section of said perforated disk. Fig. 7 represents a plan view of the same. Figs. 8 and 9, respectively, represent a diametrical section and a plan view of the washer or bearing-case.

The case $A$, resting upon the lifter-plate $B$, is made with a central hole $A^2$ for the spindle $B^2$ to pass through, and also a concentric annular groove $A^3$ to receive the balls $C$. A lip or rim $A^4$ is formed on the bottom of the casing around the hole $A^2$ to support the disk $D$ made with a perforation $D^2$ for the spindle, and perforations $D^3$ for the balls $C$. The revolving cap $F$ has a concentric annular groove $F^2$ in its under side which rests upon the balls $C$. The cap $F$ may be loosely confined in the case $A$ by means of the wire ring $H$, sprung into the groove $A^5$ formed in the interior of the sides of the casing, or it may be secured therein in any other convenient manner. A conical seat $F^3$ is formed on the top of the cap to receive the projection $J$ on the under side of the whirl $J^2$. The object of this seat is to form a sort of friction-clutch, and insures the cap $F$ revolving with the whirl $J^2$ and tube $K$.

The grooves $A^3$ and $F^2$ need not be made as deep as shown in the drawings, or they may be dispensed with.

It is obvious that more than three balls may be used, if desired.

We claim—

1. The combination with the spindle and lifter-plate, of the casing mounted on the spindle and resting on the lifter-plate, a lip or rim on the bottom of the casing surrounding the spindle and projecting above the bottom of the casing, a disk seated upon said lip or rim through which disk the spindle loosely passes, balls seating upon the bottom of the casing and projecting through and above openings in the disk, and a cap having a flange seated upon the balls above the disk and adapted to be engaged by a whirl as specified.

2. The combination with the spindle and lifter-plate, of the casing, the lip or rim on the bottom of the latter around the spindle, a disk seated on said rim and having ball-retaining openings, and through which disk the spindle loosely passes, the balls seating upon the bottom of the casing and projecting through and above the openings in the disk and a cap having a flange seated upon the balls above the disk and the conical-shaped portion on the cap and the whirl having a projection seating within the said conical portion of the cap, all as specified.

In testimony whereof we have hereunto set our hands in the presence of the two subscribing witnesses.

EDMUND GILYARD.
CHARLES WARD.

Witnesses:
DAVID NOWELL,
SAMUEL A. DEACUP.